(12) United States Patent
Martin et al.

(10) Patent No.: US 7,646,853 B2
(45) Date of Patent: Jan. 12, 2010

(54) SECURITY SYSTEM REPORTING WHICH COMPARES A CALLER TELEPHONE NUMBER WITH A TEN DIGIT ACCOUNT NUMBER

(75) Inventors: Christopher D. Martin, Plainview, NY (US); Richard H. Hinkson, Plainview, NY (US)

(73) Assignee: Honeywell International, Inc., Morristown, NJ (US)

( * ) Notice: Subject to any disclaimer, the term of this patent is extended or adjusted under 35 U.S.C. 154(b) by 817 days.

(21) Appl. No.: 10/971,192

(22) Filed: Oct. 22, 2004

(65) Prior Publication Data

US 2006/0088151 A1    Apr. 27, 2006

(51) Int. Cl.
*H04M 11/04*    (2006.01)
*H04M 1/56*    (2006.01)
*H04M 15/06*    (2006.01)
*G08B 23/00*    (2006.01)

(52) U.S. Cl. .............. 379/37; 379/142.01; 379/207.15; 340/500

(58) Field of Classification Search ............... 379/37, 379/47, 49, 93.01, 93.23, 106.01, 106.02, 379/142.01, 142.04, 142.06, 142.15, 201.08, 379/207.12, 207.14, 207.15; 340/500, 516, 340/518, 540
See application file for complete search history.

(56) References Cited

U.S. PATENT DOCUMENTS

| | | | | |
|---|---|---|---|---|
| 5,511,109 A | * | 4/1996 | Hartley et al. ................. | 379/40 |
| 5,978,457 A | * | 11/1999 | Feuerstein et al. ..... | 379/142.06 |
| 7,142,641 B2 | * | 11/2006 | Hinkson et al. ............... | 379/37 |
| 7,250,859 B2 | * | 7/2007 | Martin et al. .......... | 340/539.19 |
| 2003/0172306 A1 | * | 9/2003 | Cain et al. .................. | 713/201 |

OTHER PUBLICATIONS

Web Page Dialed Number Identification Service dated Oct. 7, 2004.
Web Page Automatic Number Identification dated Oct. 7, 2004.

* cited by examiner

*Primary Examiner*—Quoc D Tran
(74) *Attorney, Agent, or Firm*—Husch Blackwell Sanders Welsh & Katz

(57) ABSTRACT

A security central station monitors a plurality of individual subscriber security systems installed in residential or commercial accounts. Each security system at an account is programmed to periodically place a telephone call to the security central station receiver, and then to send a signal to the security central station receiver over the placed telephone call. The ten digit telephone number of the account is programmed into the security central station as the ten digit account number of record. When the signal sent by the security system is received by the security central station receiver, the security central station compares the ten digit caller telephone number with the ten digit account number of record. Normally, the ten digit caller telephone number will match the ten digit account number. However, a mismatch between the two ten digit numbers indicates to the security central station that the telephone number of the account premises protected by the security system has been changed, and alerts the security central station to investigate the matter further.

12 Claims, 1 Drawing Sheet

SECURITY SYSTEM REPORTING WHICH COMPARES A CALLER TELEPHONE NUMBER WITH A TEN DIGIT ACCOUNT NUMBER

BACKGROUND OF THE INVENTION

1. Field of Invention

The present invention relates generally to a security central station that monitors a plurality of individual subscriber security systems installed in residential or commercial accounts, and also pertains to a method of operating such a security central station.

Each security system at an account is programmed to periodically place a telephone call to the security central station receiver, and then to send a signal to the security central station receiver over the placed telephone call. The ten digit telephone number of the account is programmed into the security central station as the ten digit account number of record. When the signal sent by the security system is received by the security central station receiver, the security central station compares the ten digit telephone number calling the security central station receiver with the ten digit account number of record. Normally, the ten digit caller telephone number will match the ten digit account number. However, a mismatch between the two ten digit numbers indicates to the security central station that the telephone number of the account premises protected by the security system has been changed, and alerts the security central station to investigate the matter.

2. Discussion of the Prior Art

In the present state of the art of security systems, a security central station receiver typically monitors the operations of a large number of individual security systems over a large number of telephone lines. The security central station receiver interfaces to many different types of security systems/control panels by outputting different types of handshake signals to the different types of security systems/control panels. When a security system/control panel receives the proper handshake signal, it downloads its data to the security central station receiver, after which the central security station transmits a kiss-off signal to the security system/control panel, and issues a report on the download of data to an automation system that acts upon the download of data.

Security system installation and monitoring companies need to be able to contact their subscribers as well as the security equipment located on the premises protected by the security system. However, the telephone number of the protected premises can be subject to change due to a number of different circumstances or events. These circumstances include, but are not limited to, a) a change in the owner or occupant of the premises, b) a change of telephone service provider, and c) a reassignment of the telephone number by the telephone service provider. When one of these events occurs, the central security system monitoring company may not be able to contact the security system equipment in order to retrieve information or to change the configuration of the security system equipment.

SUMMARY OF INVENTION

The present invention provides a security central station and a method of operation thereof that compares a ten digit telephone number calling the security central station with a ten digit account number, wherein a mismatch between the two ten digit numbers indicates to the security central station that the telephone number of the account premises protected by the security system has been changed, and alerts the security central station to investigate the matter further.

BRIEF DESCRIPTION OF THE DRAWINGS

The distinctions and advantages of the present invention for a security system reporting which compares the ten digits of a caller telephone number with a ten digit account number may be more readily understood by one skilled in the art with reference to the following detailed description of several embodiments thereof, taken in conjunction with the accompanying drawings in which.

DETAILED DESCRIPTION OF THE INVENTION

Figure 1:
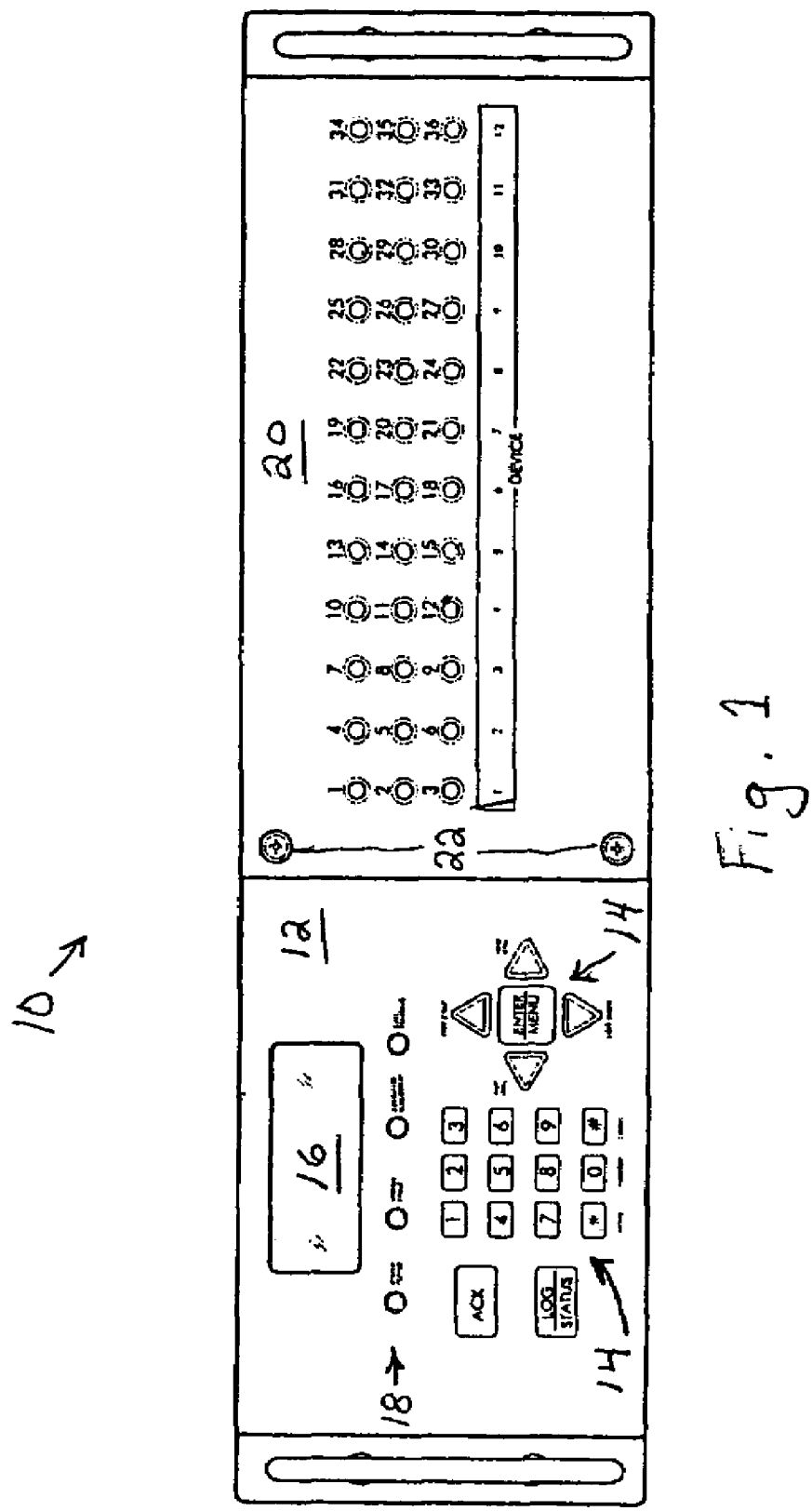
FIG. 1 illustrates a front view of a security central station receiver that is designed to monitor the operations of a large number of individual security systems over a large number of telephone lines.

FIG. 1 illustrates a front view of a security central station receiver 10 that is designed to monitor the operations of a large number of individual security systems over a large number of telephone lines. The security digital central station receiver 10 monitors a large number of individual security systems, typically installed at residential and commercial premises, and receives alarm or other security signals from each individual security system when an alarm or security event is detected by the security system, The security central station receiver 10 interfaces to many different types of security systems/control panels by outputting different types of handshake signals to the different types of security systems/control panels. When a security system/control panel receives the proper handshake signal from the security central station receiver, it downloads its data to the security central station receiver 10, after which the central security station transmits a kiss-off signal to the security system/control panel, and issues a report on the download of data to an automation system that acts upon the download of data.

The front control panel 12 of the receiver 10 includes a keypad 14 for manual operation and programming of the receiver, a display 16, and LEDs 18 indicating system operation and programming.

Pursuant to the present invention, the security central station is capable of detecting a change of the telephone number of a subscriber account protected by the security system.

A security system at a residence or business is normally programmed to periodically place a telephone call to a security central station receiver, and then to send a test or other signal to the security central station receiver over the placed telephone connection. The signal sent to the security central station receiver can be a test signal, or any other signal such as an alarm or status signal. The ten digit telephone number of the account is programmed into the security central station as the ten digit account number of record. When the signal sent by the security system is received by the security central station receiver, the ten digit account number (telephone number) in memory is compared with the ten digit caller telephone number provided by the telephone service provider for the placed telephone call, and the two ten digit numbers will normally match. If a mismatch occurs, a unique mismatch signal is sent by the security central station to the automation system, a display, printer, etc.

The security central system operator can then investigate the cause and reasons for the mismatch (new home owner, new telephone system provider, reassignment of telephone number, telephone number programmed incorrectly, etc.).

The mismatch can then be resolved by a change of the account number, if necessary.

In the case where the ownership/occupancy has changed hands, the security company will be able to use the caller information to contact the new occupant regarding possible provision of security system services.

The caller telephone number can be provided by a caller ID telephone number, or by an ANI (Automatic Number Identification) service which is a service that provides the receiver of a telephone call with the number of the calling telephone. The method of providing this information is determined by the service provider (such as AT&T, MCI, Sprint, etc.). This service is often provided by sending the digital tone multi-frequency (DTMF) tones along with the call.

While several embodiments and variations of the present invention for a security system reporting which compares the ten digit caller telephone number with a ten digit account number are described in detail herein, it should be apparent that the disclosure and teachings of the present invention will suggest many alternative designs to those skilled in the art.

Having thus described our invention, what we claim as new and desire to secure by Letters Patent is:

1. A security central station receiver that monitors a plurality of individual subscriber security systems installed in residential or commercial accounts comprising,
 a receiving section for receiving periodic communications from the plurality of individual subscriber security systems;
 a memory section for storing a ten digit account number for each of the plurality of individual subscriber security systems: and
 a comparison section for comparing a ten digit caller telephone number calling the security central station receiver with the ten digit account number stored in the memory section, the two ten digit numbers are normally the same unless there has been a change in the telephone number of the account, and wherein a detected mismatch between the ten digit caller telephone number and the ten digit account number indicates to the security central station receiver that the telephone number of the account protected by the individual subscriber security system has been changed.

2. The security central station receiver of claim 1, wherein, upon detecting a mismatch, the security central station receiver provides an output to investigate the change of the telephone number of the account protected by the security system.

3. The security central station receiver of claim 1, wherein upon detecting a mismatch, the security central station receiver provides a mismatch output signal to an automation system.

4. The security central station receiver of claim 1, wherein a security system at an account is programmed to periodically place a telephone call to the security central station receiver, and then to send a signal to the security central station receiver over the placed telephone call.

5. The security central station receiver of claim 1, wherein the ten digit telephone number of the account is programmed into the security central station receiver as the ten digit account number of record.

6. The security central station receiver of claim 1, wherein the ten digit caller telephone number is provided by a caller ID telephone number.

7. The security central station receiver of claim 1, wherein the ten digit caller telephone number is provided by an Automatic Number Identification (ANI) service.

8. A method of operating a security central station receiver that monitors a plurality of individual subscriber security systems installed in residential or commercial accounts comprising:
 programming a security system at an account to periodically place a telephone call to the security central station receiver, and then to send a signal to the security central station receiver over the placed telephone call;
 programming the ten digit telephone number of the account into the security central station receiver as the ten digit account number of record;
 when the signal sent by the security system is received by the security central station receiver, the security central station receiver compare the ten digit caller telephone number calling the security central station receiver with the ten digit account number of record, and normally the ten digit caller telephone number will match the ten digit account number, and a mismatch between the two ten digit numbers indicates to the security central station receiver that the telephone number of the account protected by the security system has been changed.

9. The method of claim 8, wherein upon detecting a mismatch, The security central station receiver provides an output to investigate the change of the telephone number of the account protected by the security system.

10. The method of claim 8, wherein upon detecting a mismatch, the security central station receiver provides a mismatch output signal to an automation system.

11. The method of claim 8, including providing the ten digit caller telephone number by a caller ID telephone number.

12. The method of claim 8, including providing the ten digit caller telephone number by an Automatic Number Identification (ANI) service.

* * * * *

UNITED STATES PATENT AND TRADEMARK OFFICE
CERTIFICATE OF CORRECTION

PATENT NO. : 7,646,853 B2
APPLICATION NO. : 10/971192
DATED : January 12, 2010
INVENTOR(S) : Martin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1061 days.

Signed and Sealed this

Sixteenth Day of November, 2010

David J. Kappos
*Director of the United States Patent and Trademark Office*